United States Patent [19]
Tupalski

[11] 3,777,476
[45] Dec. 11, 1973

[54] CONNECTING LINKS FOR CHAINS
[76] Inventor: Alexander Tupalski, 22 Ardlethan St., Fisher A.C.T., Australia 2611
[22] Filed: Aug. 2, 1971
[21] Appl. No.: 167,907

[30] Foreign Application Priority Data
Aug. 17, 1970 Great Britain.................. 39,532/70

[52] U.S. Cl. ..................................................... 59/85
[51] Int. Cl. .......................................... F16g 15/00
[58] Field of Search ..................... 59/85, 86, 93, 78, 59/84, 90

[56] References Cited
UNITED STATES PATENTS
| | | |
|---|---|---|
| 2,648,989 | 8/1953 | Cordis..................................... 59/85 |
| 1,721,801 | 7/1929 | Alexandria............................... 59/85 |
| 2,175,504 | 10/1939 | Ehmann................................... 59/85 |
| 2,620,650 | 12/1952 | Cotti........................................ 59/85 |
| 3,068,637 | 12/1962 | Robbins................................... 59/85 |
| 3,559,713 | 2/1971 | Mueller.................................. 152/243 |
| 3,621,651 | 11/1971 | Gillespie................................. 59/85 |

FOREIGN PATENTS OR APPLICATIONS
645,457   11/1950   Great Britain.......................... 59/85

Primary Examiner—Charles W. Lanham
Assistant Examiner—Gene P. Crosby
Attorney—Holcombe, Wetherill et al.

[57] ABSTRACT

A connecting link, for connecting a length of chain to another such length or to an anchorage loop. A body portion is provided similar to those of the links of the chain but having a gap on one side, through which such links can be passed, with outward projections flanking such gap for securely receiving a closing member to close the gap.

2 Claims, 3 Drawing Figures

CONNECTING LINKS FOR CHAINS

This invention relates to a connecting link for connecting together two lengths of chain (which may be separate from one another or may consist of the two ends of a single chain) or for connecting a length of chain to an anchorage loop. Whilst generally applicable to many types of chain, the invention is more especially intended for heavy-duty chains, such as ships' anchor chains or haulage chains, including chains used in conjunction with capstans or sprocket wheels for transmitting tensional drives. In such cases, it is important that the connecting chain link should have a shape closely resembling that of the links of the chain length or lengths with which it is to be used, so that after the connecting link will act as one of the links of the chain without interference with proper cooperation with an associated capstan or sprocket wheel.

To this end, the connecting chain link according to the invention comprises a main portion similar to the corresponding portions of the links of the chain length or lengths with which it is to be used, and has a gap on one side, through which such links can be passed, together with outward projections one or either side of such gap for securely receiving a closing member to close the gap.

Preferably, the side surfaces of the said outward projections remote from the gap are recessed to receive associated parts of the closing member, the assembly of the closing member on to the connecting link being effected by subjecting such link to a compressional force against its resilience to permit the closing member to be snapped over into engagement in the recesses in the outward projections. A locating tongue may be provided on one of the said outward projections for holding the closing member in engagement in the recess in such projection prior to engagement of the closing member into the recess in the other outward projection.

The invention may be carried into practice in various ways, but the accompanying drawings show a preferred construction of connecting link according thereto, for use in a chain having links of a standard oval or flattened oval shape, wherein the axial plane of each link, when the chain is stressed, lies substantially at right angles to the axial plane of the next link.

In these drawings.

Figure 1:
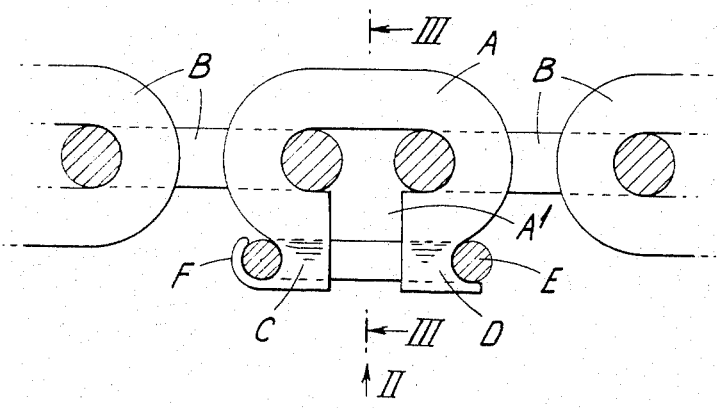
FIG. 1 shows the connecting link in front view, in position between the ends of two lengths of chain to be connected together.
Figure 2:
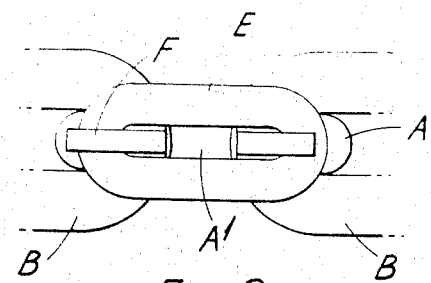
FIG. 2 shows the connecting link as viewed in the direction of the arrow II of FIG. 1.
Figure 3:
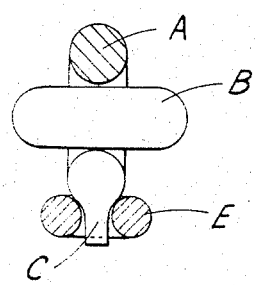
FIG. 3 is a sectional view of the connecting link taken on the line III—III of FIG. 1.

In this preferred construction, the connecting link A has a general shape identical with that of the links of the two lengths of chain B to be connected together, with the exception that a gap $A^1$ is left in one limb of the link A, of sufficient width to enable a link of the chain B to be passed through it, the link A being provided with two projections C and D extending outwardly from the end portions of the link which face one another across the gap $A^1$.

The surfaces of the two projections C and D are each recessed on the side furthest from the gap $A^1$ to accomodate a closing ring E. Such closing ring is of oval or flattened oval shape and of a size sufficient to embrace the two outward projections C and D and to hold them properly in position. The shape of each recess in such as to fit the shape of the inner surface of an end portion of the closing ring E so that the ring will fit snugly on to the recessed portion of each outward projection with an ample surface area of engagement.

In order to assemble the closing ring E on to the projections C and D, it is necessary to submit the connecting link A, for example in a vice or clamp, to a compressional stress to bring the two outward projections C and D temporarily closer together to an extent sufficient to enable the closing ring E to be passed over the projections into a position such that it will enter into close engagement with the recesses therein when the compressional force on the link is released, to enable the link to revert under the action of its own resilience to its normal shape or nearly to its normal shape. To facilitate such assembly, a locating tongue F is provided on the outer surface of one C of the two outward projections C and D, the tongue being bent around the surface of one end of the closing ring E to hold the ring in engagement in the recess of such outward projection C, in readiness for swinging the other end of the ring E over the other projection D when the compressional force is applied to the link.

Such tongue F can be forged as an integral part of the link A during manufacture thereof or alternately can be a separate part secured to the projection C on the link, for example by spot welding. It will be appreciated that such tongue is not called on to take any strain after assembly of the closing ring E on to the projections C and D, and need therefore have only sufficient strength to hold the ring initially in position prior to such assembly.

The closing ring E is preferably of seamless construction and can have a smaller cross-section than that of the main link A, for example of the order of half that of the main link, but it is important that its cross-section and the hardening to which it is subjected by heat treatment in its manufacture should be such that the closing ring can take its proper share of the load to which the chain B is to be subjected in practical use, without permitting any harmful distortion of the main link. Likewise, the dimensions of the outward projections C and D must be such that they too can take their proper share of the load.

Thus, in practical use, the connecting link A, in its normal open condition, with the closing ring E loosely held by the locating tongue F, is passed over the two elements of the chain B to be connected together, so that such elements will engage respectively with the inner surfaces of the two end loop portions of the connecting link, and the closing ring E is then assembled in position in the manner above described.

The connecting link A may be employed for connecting together two lengths of chain (or the two end portions of a single length of chain, if it is desired to form the chain into a closed loop), or may be employed for anchoring one length of chain to a fixed loop or to a loop on a source of tensional power or to a loop on a load to be hauled, or for other analogous purposes as may be desired. When so employed the connecting link A will act as an additional link of the chain B, and it will be noted that the construction of the connecting link is such that when the chain is wound on a capstan or is used in association with a sprocket wheel it can adequately perform its function as an additional link of the chain without interference with proper cooperation with the capstan or with the sprocket wheel.

It will be appreciated that the foregoing construction may be modified in various ways, within the scope of the invention. For example, other forms of closing member may be employed, in place of the closing ring described above. Thus, for example, the closing member may consist of a plate of adequate strength formed with a slot (or with two separate slots) for the reception of the two outward projections of the link. Again, the connecting link according to the invention may be employed (with appropriate constructional modification) in conjunction with types of chain other than the standard type above referred to. Thus, in the case of a chain having studded links, that is links each strengthened with a central strut, two gaps may be provided, one in each half of the studded connecting link, each gap being closed with its own closing member.

I claim:

1. A connecting link for chains, for connecting two lengths of chain together or for connecting a length of chain to an anchorage or other loop, said connecting link comprising a main portion similar in shape, strength and resilience to the corresponding portions of the links of the chain with which it is to be used, and having a gap on one side through which such links can be passed, outward projections from the connecting link one on either side of the gap, each of such outward projections being provided with a recess on the side remote from the gap, a closing member for closing the gap by engagement with such outward projections, and means for holding the closing member in engagement with one of the outward projections but free to be swung into engagement in the recess in the other outward projection, the link being subjected to a compressional force against its resilience during such swinging over to permit the closing member to be snapped over into locking engagement in the said recess in the outward projection, the closing member and the outward projections being of adequate strength to take their appropriate shares of the load of tensional forces applied to the chain in practical use.

2. A connecting link for chains, for connecting two lengths of a chain together or for connecting a length of chain to an anchorage or other loop, said connecting link comprising a main portion similar in shape, strength and resilience to the corresponding portions of the links of the with which it is to be used, and having a gap on one side through which such links can be passed, outward projections from the connecting link one on either side of the gap, at least one of such outward projections being provided with a recess on the side remote from the gap, a closing member for closing the gap by engagement with such outward projections, retaining means for holding the closing member in engagement with one of the outward projections but free to be swung into engagement in the recess in the other outward projection, the link being submitted to a compressional force against its resilience during such swinging movement to permit the closing member to be snapped over into locking engagement in the recess in the said other projection, the closing member and the outward projections having adequate strength to take their appropriate shares of the load of tensional forces applied to the chain in practical use, the said retaining means comprising a locating tongue extending around part of the closing member for preventing escape of the closing member from a recess in the said one outward projection.

* * * * *